US012619086B2

(12) United States Patent
Kollin et al.

(10) Patent No.: US 12,619,086 B2
(45) Date of Patent: May 5, 2026

(54) NEAR-EYE DISPLAY SYSTEMS UTILIZING AN ARRAY OF PROJECTORS

(71) Applicant: Microsoft Technology Licensing, LLC, Redmond, WA (US)

(72) Inventors: Joel Steven Kollin, Seattle, WA (US); Andreas Georgiou, Cambridge (GB); Ishan Chatterjee, Mountain View, CA (US); Bernard Charles Kress, Redwood City, CA (US); Maria Esther Pace, Palo Alto, CA (US); Mario Possiwan, Reultingen (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 801 days.

(21) Appl. No.: 17/932,154

(22) Filed: Sep. 14, 2022

(65) Prior Publication Data

US 2024/0085714 A1     Mar. 14, 2024

(51) Int. Cl.
G02B 27/09         (2006.01)
G02B 27/00         (2006.01)
(Continued)

(52) U.S. Cl.
CPC ..... G02B 27/0944 (2013.01); G02B 27/0081 (2013.01); G02B 27/0972 (2013.01);
(Continued)

(58) Field of Classification Search
None
See application file for complete search history.

(56) References Cited

U.S. PATENT DOCUMENTS 10,025,093 B2 * 7/2018 Wall .................... G02B 27/0081
2018/0321496 A1 * 11/2018 Bohn ...................... G09G 3/003
(Continued)

FOREIGN PATENT DOCUMENTS

CN     113687514 A     11/2021
CN     216848346 U     6/2022
(Continued)

OTHER PUBLICATIONS

International Search Report and Written Opinion received for PCT Application No. PCT/US2023/030756, mailed on Dec. 8, 2023, 14 Pages.

*Primary Examiner* — Derek S. Chapel
(74) *Attorney, Agent, or Firm* — Alleman Hall LLP

(57)         ABSTRACT

The present disclosure describes near-eye display systems including an array of projectors and a one-dimensional exit pupil expander. The array of projectors can be arranged along a first dimension and can output image light towards an input coupler within a waveguide that provides one-dimensional exit pupil expansion. In some implementations, arrays of monochromatic projectors are implemented and arranged in offset columns. The input coupler in-couples the image light from the array of projectors into a TIR path within the waveguide. Different optical elements, including diffractive and reflective optics, may be implemented as the input coupler. The image light travels within the waveguide until it interacts with an output coupler. Upon interaction with the output coupler, the image light is expanded in a second dimension transverse to the first dimension and is coupled out of the waveguide.

20 Claims, 16 Drawing Sheets

(51) Int. Cl.
G02B 27/01 (2006.01)
*F21V 8/00* (2006.01)

(52) U.S. Cl.
CPC .... *G02B 6/0068* (2013.01); *G02B 2027/0174* (2013.01); *G02B 2027/0178* (2013.01)

(56) References Cited

U.S. PATENT DOCUMENTS

2021/0281047 A1* 9/2021 Shahin .................. H01S 5/3414
2022/0107504 A1 4/2022 Wheelwright

FOREIGN PATENT DOCUMENTS

CN 115016126 A 9/2022
GB 2598946 A 3/2022

* cited by examiner

1102

Output Coupler

Output Coupler

1100

Eyebox

1104

Output Coupler

Output Coupler

1100

Eyebox

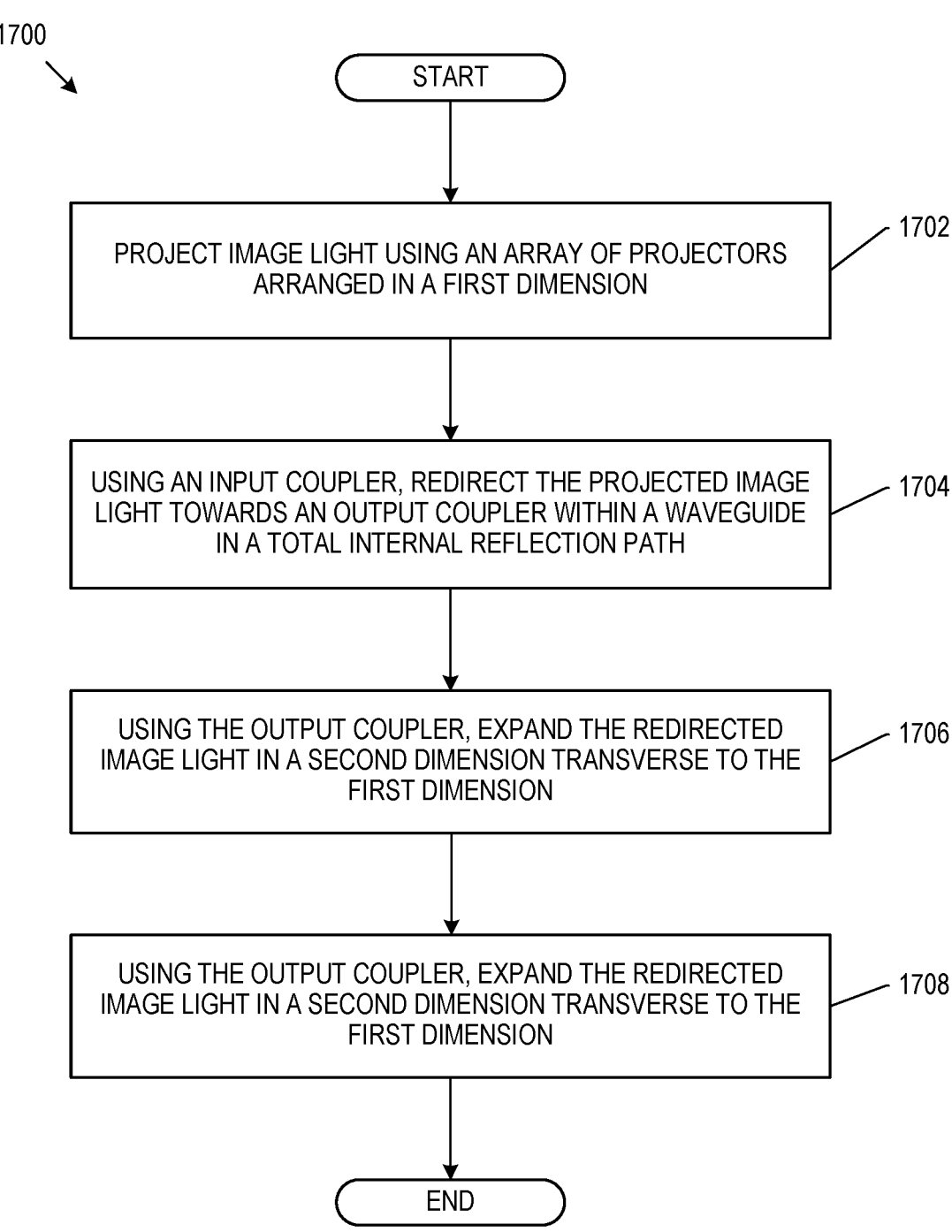

START

PROJECT IMAGE LIGHT USING AN ARRAY OF PROJECTORS ARRANGED IN A FIRST DIMENSION — 1702

USING AN INPUT COUPLER, REDIRECT THE PROJECTED IMAGE LIGHT TOWARDS AN OUTPUT COUPLER WITHIN A WAVEGUIDE IN A TOTAL INTERNAL REFLECTION PATH — 1704

USING THE OUTPUT COUPLER, EXPAND THE REDIRECTED IMAGE LIGHT IN A SECOND DIMENSION TRANSVERSE TO THE FIRST DIMENSION — 1706

USING THE OUTPUT COUPLER, EXPAND THE REDIRECTED IMAGE LIGHT IN A SECOND DIMENSION TRANSVERSE TO THE FIRST DIMENSION — 1708

END

NEAR-EYE DISPLAY SYSTEMS UTILIZING AN ARRAY OF PROJECTORS

BACKGROUND

Near-eye display (NED) technology may be used to create a virtual image in the field of view (FoV) of one or both eyes of a user. Such technology may be incorporated into wearable displays such as head-mounted displays (HMDs), which can be implemented in the form of different devices. Common implementations include helmet-mounted displays, eyeglasses, visors, and other eyewear. Rather than creating a real image on a surface, a near-eye display presents the virtual images to the eye such that they appear at a distance, making such technology well-suited for applications in augmented reality (AR), virtual reality (VR), and mixed reality (MR).

Near-eye displays generally include a projector and various imaging optics components depending on the specific application. The projector may comprise a light-emitting display (e.g., displays utilizing light-emitting diodes (LEDs), microLEDs (μLEDs), or organic light-emitting diodes (OLEDs)), or an illuminated light-modulating device (e.g., liquid-crystal displays (LCDs), liquid-crystal on silicon (LCOS) displays, or digital micromirror devices (DMDs)). The attainable image resolution, contrast, and color accuracy is a function of a type of projector implemented along with the imaging optics utilized.

One class of imaging optics commonly used for NEDs includes waveguide optics. These systems implement a waveguide that collects light at the input and relays it to the eye, allowing for the projector and other components to be located out of the FoV of a user. Additionally, waveguide optics allow for the integration of multiple optical functions into a thin, transparent, lightweight substrate. For example, the waveguide outcouples light at a multiplicity of points, allowing the exit pupil to be replicated and thus expanding the effective eyebox of the NED.

SUMMARY

Examples are disclosed that relate to near-eye display systems including an array of projectors and a one-dimensional exit pupil expander. The array of projectors can be arranged along a first dimension and can output image light towards an input coupler within a waveguide that provides one-dimensional exit pupil expansion. In some implementations, arrays of monochromatic projectors are implemented and arranged in offset columns. The input coupler couples the image light from the array of projectors into a TIR path within the waveguide. Various optical elements, including diffractive and reflective optics, can be implemented as the input coupler. The image light travels within the waveguide until it interacts with an output coupler. Upon interaction with the output coupler, the image light is expanded in a second dimension transverse to the first dimension and is coupled out of the waveguide. Different optical elements, including diffractive and reflective optics, may be implemented as the output coupler.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 17 is a flow chart conceptually illustrating an example method for providing two-dimensional exit pupil expansion, which may be implemented using the system of FIG. 1 or other suitable devices, in accordance with an implementation of the present disclosure.

DETAILED DESCRIPTION

Figure 1:
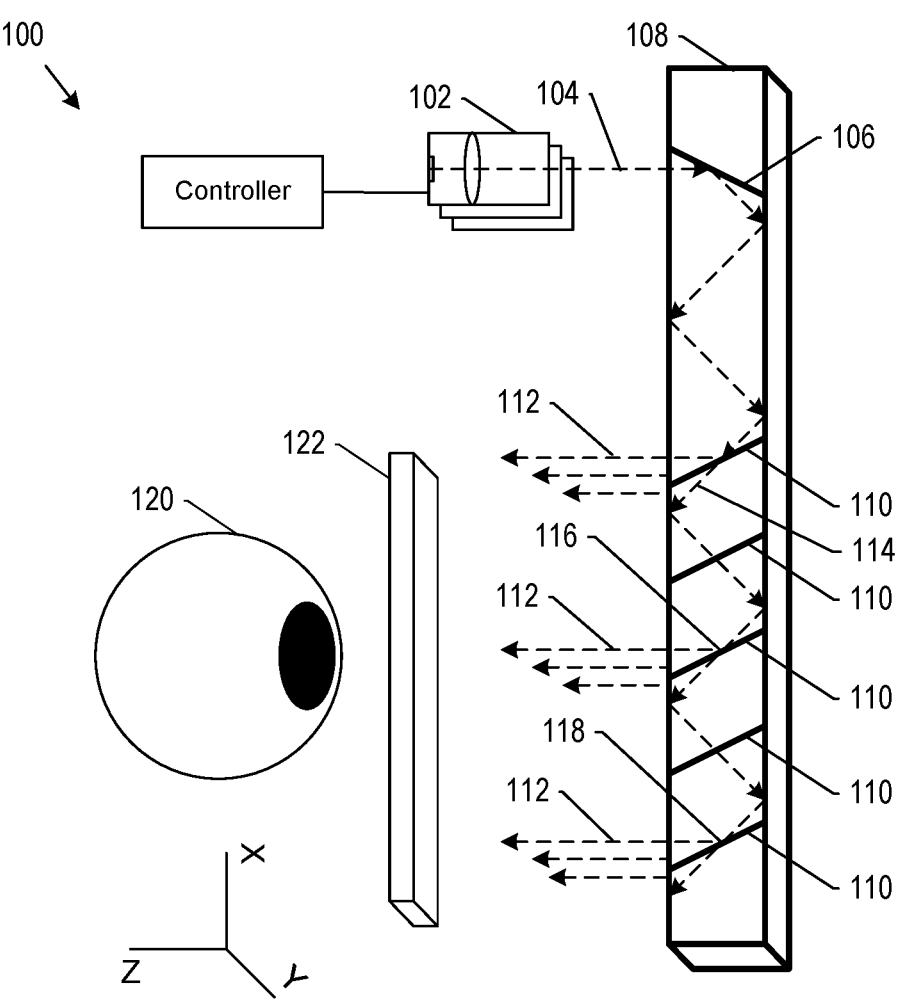
FIG. 1 shows an example near-eye display system in accordance with an implementation of the present disclosure.

For illustrative purposes, it is to be understood that the figures of the present disclosure are not drawn to scale unless stated otherwise.

In some near-eye display systems, a display image is projected and redirected towards a user's eye using various imaging optics. To the eye, the virtual image appears at a distance and appears larger relative to the projector and the optics used to create the image. However, one challenge in this area is to present the display image over a sufficiently large exit pupil. In display applications, this translates to a larger eyebox. One solution is to use multiple projectors to directly provide a larger exit pupil. However, depending on the desired resolution, FoV, and eyebox, the number of projectors can be prohibitively high. Fresnel lenses and pancake optics have been considered. However, both approaches are bulky and non-transparent and therefore suited more for VR or video-passthrough MR applications than optical AR applications.

Solutions utilizing a single projector along with exit pupil expanders have been proposed for providing a sufficiently large exit pupil. An exit pupil expander replicates a single pupil created by a small display engine to multiple points in front of the user's eye, which form the eyebox. One-dimensional exit pupil expanders relying on an anamorphic or large projector have been proposed. Other approaches resort to large and bulky optics to achieve a large eyebox. However, the size and weight of such systems can be unacceptable to a user. More compact solutions use diffractive or reflective structures to provide two-dimensional exit pupil expansion. For example, near-eye display systems have been proposed where the exit pupil of the optical system is expanded using diffraction gratings or partially reflective mirrors in a waveguide structure. In some approaches, the system uses an in-coupling grating to redirect light from a projector into the waveguide. The in-coupled light travels to a second grating that redirects a portion of the light at each grating interaction while the remaining portion continues to travel in the same direction. The grating interactions repeat for the remaining portion of light, and the image is effectively replicated at each interaction to provide exit pupil expansion in one dimension. The redirected portions of light travel to a third grating, which out-couples a portion of the light towards the user's eye at each grating interaction. Similar to the second grating's interactions, the remaining portion continues to travel in the same direction, and the grating interactions are repeated to provide exit pupil expansion in a second dimension. In a typical implementation, the pupil is expanded in two orthogonal directions. For ease of reference, the two orthogonal directions may be referred to as vertical and horizontal directions.

In practical display applications, which demand high color uniformity and large FoVs, implementing two-dimensional exit pupil expansion is a difficult problem that requires balancing size, cost, performance, and manufacturability. For example, designing and testing appropriate diffractive structures can involve modeling and simulating the millions of grating interactions that will occur inside the waveguide. For a waveguide with three separate grating areas, the number of computations and difficulty in manufacturing result in an extensive, time-consuming design and testing process. Another drawback in such systems is light efficiency. More complex grating architectures result in an increase in grating interactions, which will reduce total light efficiency due to interference and general losses of light at grating interactions. Further, light traveling and diffracting within the waveguide can result in multiple light paths that travel to the same point at the out-coupler grating. This can create interference that manifests itself as an output intensity variation and color degradation.

In view of the observations above, examples are disclosed that relate to near-eye displays utilizing an array of projectors and a waveguide for one-dimensional exit pupil expansion in accordance with various implementations of the present disclosure. FIG. 1 schematically shows an example of a near-eye display system 100 in accordance with an implementation of the present disclosure. Near-eye display system 100 is shown schematically and may be implemented in any of a variety of form factors. Examples include helmet, visor, glasses, and goggle form factors.

As shown, the system 100 includes an array of projectors 102 in communication with a controller 103. Different configurations of projectors may be utilized depending on the application. For example, full color applications may implement multiple single-color projectors. In some implementations, scanned projectors are implemented. For example, projectors implementing scanning elements such as a single two-dimensional scanning mirror or two one-dimensional scanning mirrors can be utilized for forming an image. In other implementations, a single one-dimensional mirror is utilized with a line of LEDs. The controller 103 may be implemented using a logic processor and memory, which can include volatile and/or non-volatile memory. The memory stores instructions, which, when executed by the logic processor, enable operation of the near-eye display. The controller 103 can provide instructions to the array of projectors 102. In other implementations, the controller 103 also provides instructions to additional dynamic components, such as movable mechanic parts, of the near-eye display. In some implementations, the controller 103 is implemented on a printed circuit board in proximity to the array of projectors 102. In other implementations, the controller 103 is implemented as a separate device, such as a personal computer or mobile device, in wired or wireless communication with the near-eye display. For simplicity purposes, controllers are omitted from later figures.

The array of projectors 102 outputs image light 104 towards an input coupler 106, which in-couples the image light 104 into a total internal reflection (TIR) path within a waveguide 108. The array of projectors 102 may be arranged along a first dimension to provide image light 104 similar to image light that have had exit pupil expansion performed in one dimension. As such, the waveguide 108 and input coupler 106 may be designed to receive image light that had exit pupil expansion performed in one dimension. For example, the input coupler 106 may be extended or elongated to accommodate the expanded image light. In the depicted system 100, the projectors 102 are arranged in a row along the Y-Axis indicated in FIG. 1. Thus, the image light 104 is effectively expanded along the Y-Axis before it is coupled into the waveguide 108.

The input coupler 106 may be implemented using various different optical elements. For example, the input coupler 106 may include a grating, a prism, and/or a mirror. In many applications, the input coupler 106 is designed to have a relatively high efficiency for in-coupling the image light 104 to minimize the amount of light that is loss in the waveguide 108. In the depicted system 100, the input coupler 106 comprises a mirror.

The image light 104 is coupled into the waveguide 108 and travels in a TIR path until it interacts with an output coupler 110. The output coupler 110 may be implemented using various different optical elements. In various examples, the output coupler 110 may include a grating and/or a partially reflective mirror. The output coupler 110 is designed and constructed to have an efficiency profile such that a portion 112 of incident light is redirected out of the waveguide 108 while the remaining portion 114 continues in TIR, resulting in subsequent interactions 116, 118 with the output coupler 110. In the depicted system 100, the output coupler 110 comprises a series of partially reflective mirrors designed to out-couple a portion of incident light while allowing the remaining portion to pass. To help avoid a noticeable dimming of output light along a length of output coupler 110, the efficiency profile of the output coupler 110 can vary in a direction of light propagation. Since the total amount of incident light on subsequent partially reflective mirrors decreases due to the portions that are out-coupled by preceding partially reflective mirrors, the subsequent partially reflective mirrors may be implemented and arranged sequentially to have an increasing efficiency profile in order to out-couple a similar amount of light as preceding partially reflective mirrors. For a specific pixel traveling within the waveguide 108, the set of propagating rays will include rays having complimentary angles to each other. As such, some rays may hit the output coupler 110 at a wrong angle and are not out-coupled. These rays can create noise in the waveguide and may be dealt with using a variety of methods, including designing the waveguide 108 and optical elements 106, 110 such that the noise remains trapped within the waveguide 108 or absorbed at the end.

At each interaction with the output coupler 110, a portion of image light is out-coupled, effectively replicating the image and expanding the exit pupil along the direction in which the image light 104 is traveling. The array of projectors 102 and output coupler 110 can be oriented to expand the exit pupil in a second dimension that is transverse to the first dimension. In some implementations, the second dimension is orthogonal to the first dimension. In the depicted system 100, the image light 104 projected from the array of projectors 102 is effectively expanded along the Y-Axis by the array of projectors 102 and is then expanded in the X-Axis direction by the output coupler 110. Consequently, the out-coupled light 112 is expanded in two dimensions when it is directed towards the user's eye 120. The eye positions that allow the user to see the image form an eyebox 122. Exit pupil expansion enlarges the eyebox 122.

Figure 2:
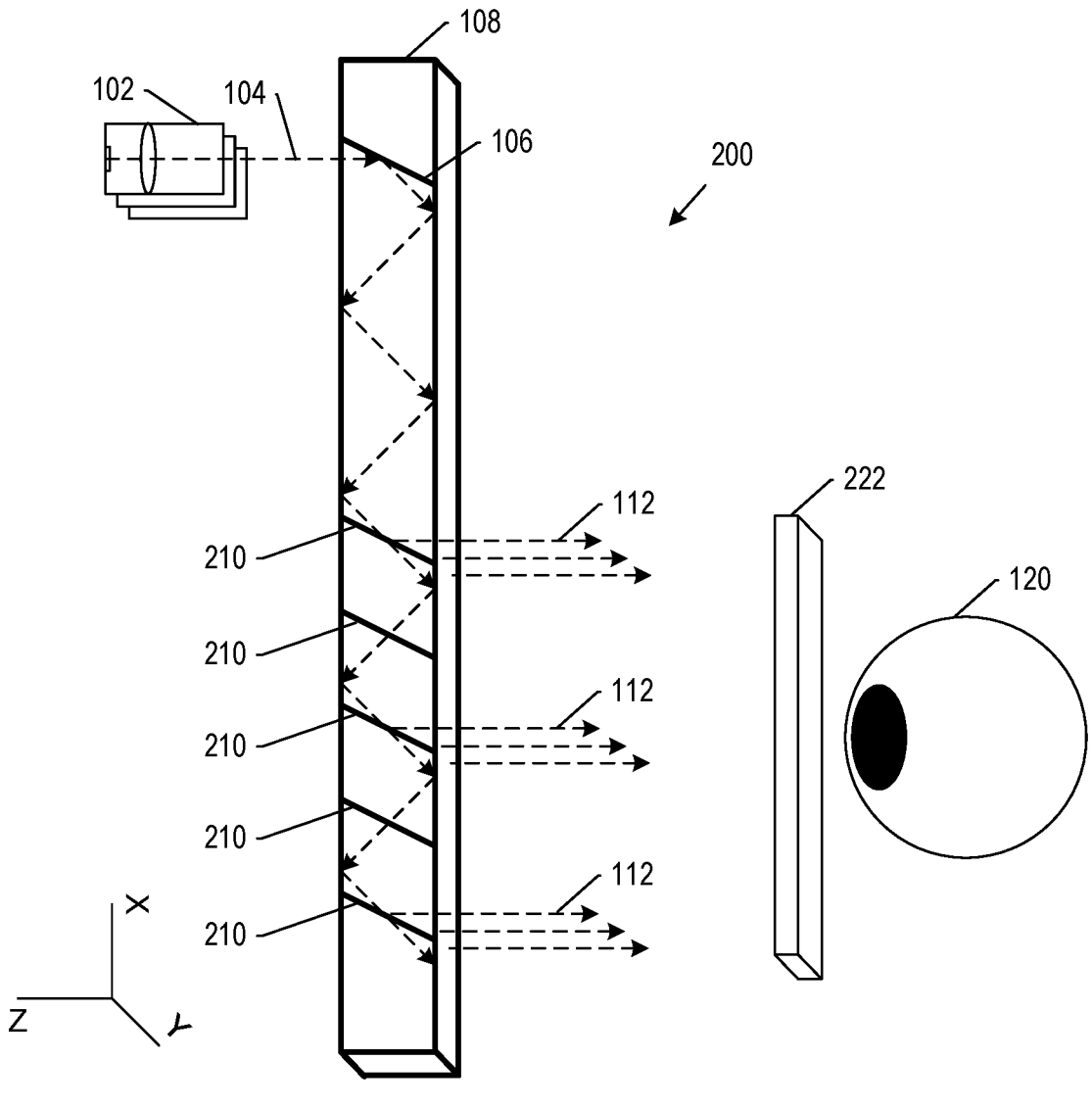
FIG. 2 shows an example near-eye display system comprising an eyebox on a side of the waveguide opposite an array of projectors in accordance with an implementation of the present disclosure.

FIG. 1 depicts a specific example near-eye display system for providing two-dimensional exit pupil expansion, and various other configurations can be implemented depending on a given application. For example, the near-eye display may be designed to have an eyebox on a side of the waveguide opposite the array of projectors. FIG. 2 shows a near-eye display system 200 with an eyebox 222 on a side of the waveguide 108 opposite the array of projectors 102 in accordance with an implementation of the present disclosure. As shown, the waveguide 108 includes an output coupler 210 designed and oriented to out-couple the image light 104 out of the waveguide 108 on a side opposite the array of projectors 102.

Figure 3A:
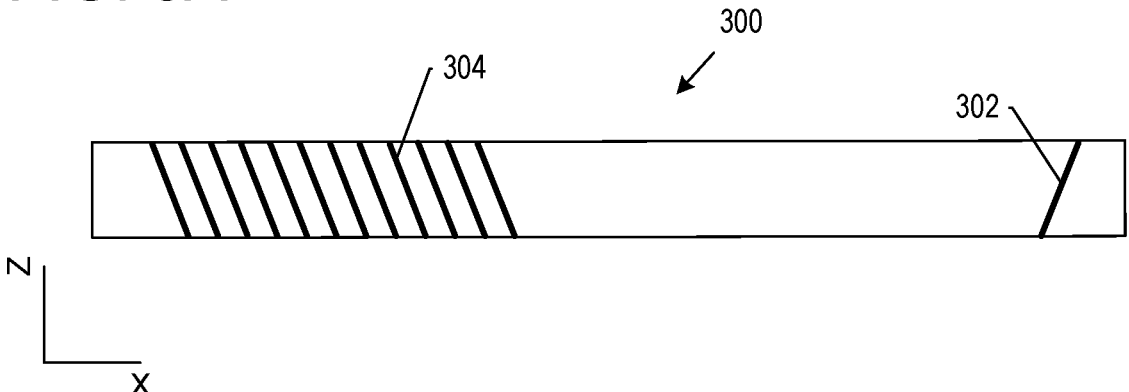
FIGS. 3A-3C show example waveguides implementing different types of optical elements as input and output couplers in accordance with various implementations of the present disclosure.
Figure 3B:
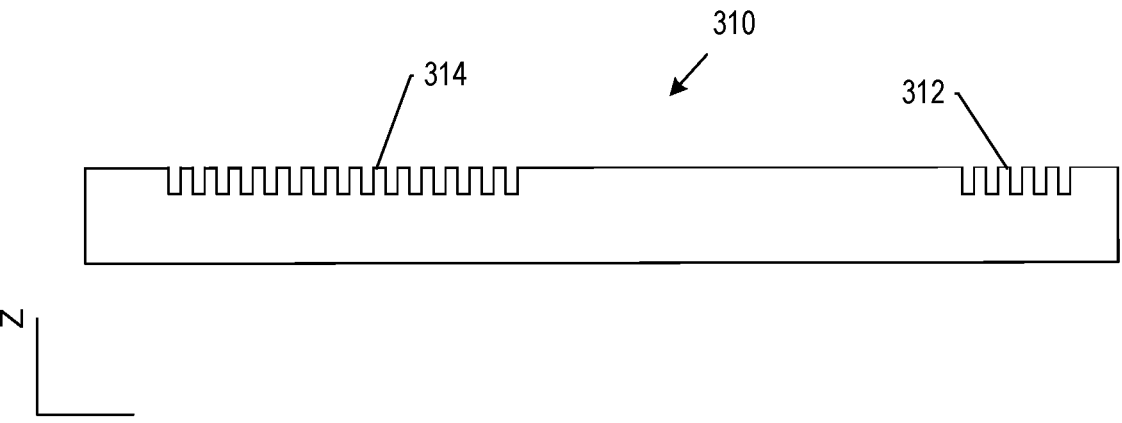
Figure 3C:
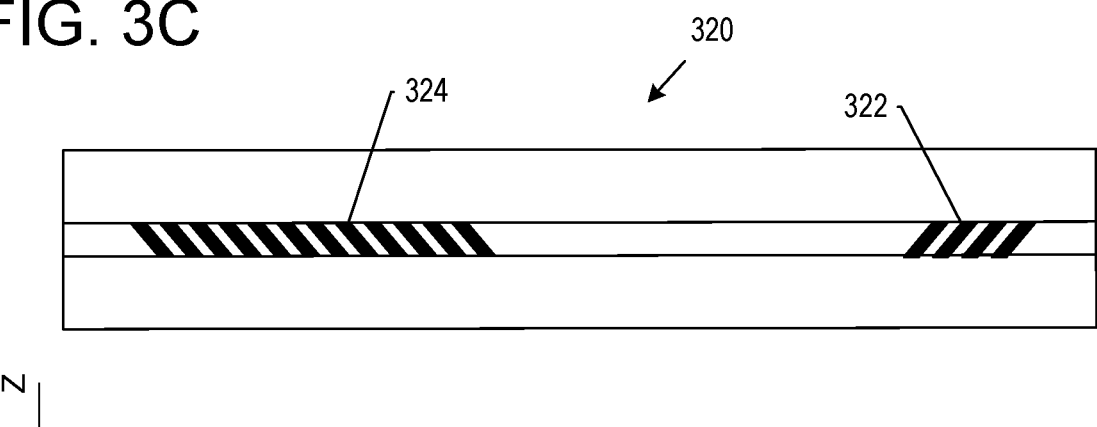

As discussed above, the input and output couplers may be implemented using different optical elements. In the depicted systems of FIGS. 1 and 2, the input coupler is a mirror, and the output coupler is a periodic structure of partially reflective mirrors. In other implementations, the input coupler and/or output coupler is implemented as diffractive elements, such as surface relief gratings and holographic gratings. In some implementations, the input coupler is a prism. FIGS. 3A-3C show waveguides implementing different types of optical elements as input and output couplers in accordance with various implementations of the present disclosure. FIG. 3A shows an example waveguide 300 with a mirror implemented as an input coupler 302 and a series of partially reflective mirrors implemented as an output coupler 304. FIG. 3B shows an example waveguide 310 with surface relief gratings implemented as the input 312 and output 314 couplers. FIG. 3C shows an example waveguide 320 with holographic gratings implemented as the input 322 and output 324 couplers. Although FIGS. 3A-3C illustrate example waveguides each with input and output couplers having the same type of optical elements, various other configurations may be implemented as appropriate. In some implementations, the input and output couplers are different optical elements. For example, a waveguide may implement a mirror as the input coupler and a surface relief grating as the output coupler. Different configurations will have separate advantages and disadvantages depending on the application. For example, depending on the type of projector implemented, chromatic dispersion introduced by input and output couplers may be an issue. In some implementations, the input coupler and the output coupler are matched to correct for chromatic dispersion such that the angle error introduced by one coupler is cancelled by the other coupler. The couplers may be matched using similar structures and/or grating vectors. In other implementations, one or more additional optical elements is implemented to correct for the chromatic dispersion. In some implementations, highly monochromatic projectors are implemented, which reduce or eliminate chromatic aberrations caused by chromatic dispersion for any given color. In these instances, the transverse chromatic aberration between the different highly monochromatic color sources may be corrected in software.

The systems described above can provide two-dimensional exit pupil expansion using a waveguide designed for exit pupil expansion in only one dimension. Such designs may lower the complexity of the waveguide and, consequently, the manufacturing difficulty and yield. For example, as described above, systems for two-dimensional exit pupil expansion utilize waveguides having three optical elements—a first diffractive element for coupling light into the waveguide, a second diffractive element for exit pupil expansion in a first dimension, and a third diffractive element for exit pupil expansion in a second dimension while simultaneously coupling the light out of the waveguide. In contrast, waveguides in accordance with various implementations of the present disclosure are designed with an input coupler for in-coupling light expanded in a first dimension and an output coupler for expanding light in a second dimension and for coupling the light out of the waveguide. Since the waveguide is designed to receive light that is effectively expanded in a first dimension, an intermediary optical component for exit pupil expansion is not necessary for two-dimensional exit pupil expansion.

Figure 4:
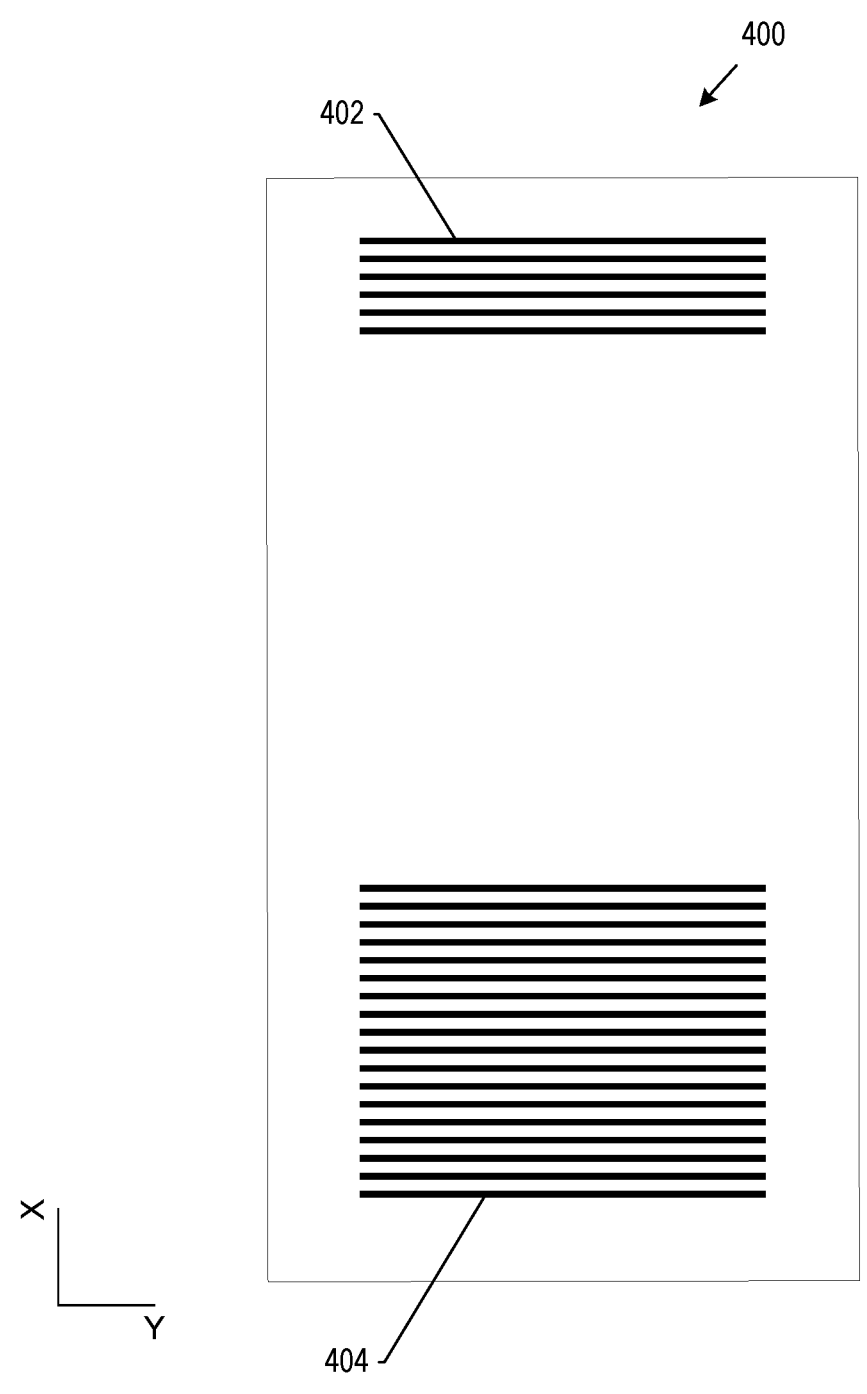
FIG. 4 shows an example waveguide for receiving light expanded in one dimension in accordance with an implementation of the present disclosure.

FIG. 4 shows a waveguide 400 for receiving light expanded in one dimension in accordance with an implementation of the present disclosure. As shown from a plan view, the waveguide 400 includes an input coupler 402 and an output coupler 404. The input coupler 402 is elongated (compared to waveguides for two-dimensional exit pupil expansion) to receive image light that is expanded in a first dimension. In the depicted waveguide 400 of FIG. 4, the input and output couplers 402, 404 are implemented using diffraction gratings. Other optical components such as prisms, mirrors, partially reflective mirrors, and reflection gratings may be used as appropriate depending on the application.

Near-eye display systems in accordance with various implementations of the present disclosure provide for architectures that advantageously allow for different manufacturing processes than other systems. For example, the projectors utilized may be simpler and easier to manufacture compared to a single, higher specification projector typically utilized in other near-eye displays. For example, the array of projectors may comprise a single stack of lenslet arrays and a single display device. Further, one-dimensional exit pupil expander waveguides, such as the example depicted in FIG. 4, include two diffractive optical elements for two-dimensional exit pupil expansion. This shortens the path travelled by the light and reduces the number of bounces within the waveguide. This allows for simpler manufacturing and lower tolerances. The waveguide may be made of plastic instead of glass, which lowers material costs and enables different manufacturing processes. For example, the waveguide may be injection molded, enabling a low-cost, high-volume manufacturing process. Plastic waveguides also enable different waveguide designs and functionalities.

Figure 5:
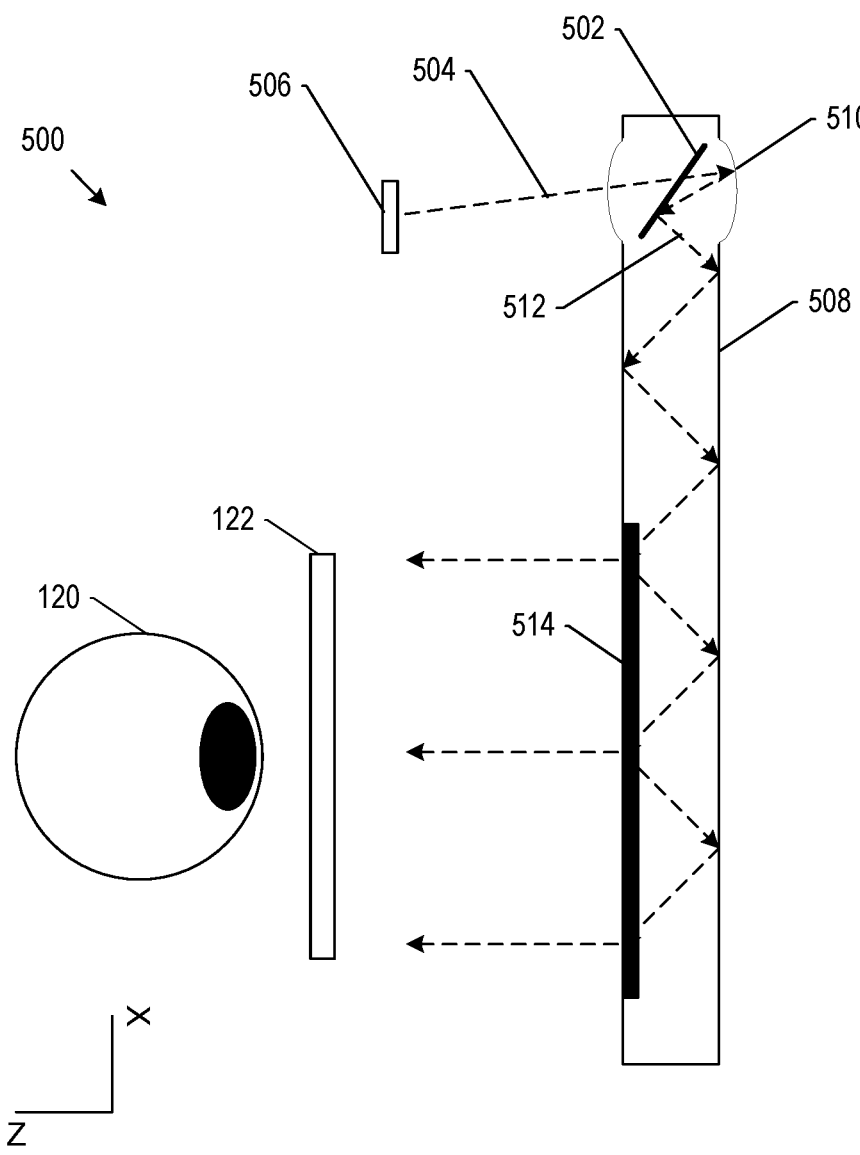
FIG. 5 shows an example near-eye display system utilizing bird bath optics and a polarization-selective reflector in accordance with an implementation of the present disclosure.

In some implementations, a plastic waveguide is implemented with bird-bath optics and a semi-transparent reflector to collimate the image light from the array of projectors. This may reduce the cost and size of the near-eye display. FIG. 5 shows a near-eye display system 500 utilizing bird bath optics and a polarization-selective reflector 502 in accordance with an implementation of the present disclosure. As shown, uncollimated image light 504 is projected from an array of projectors 506 into a waveguide 508. The uncollimated light 504 interacts with a spherical combiner 510 and the polarization-selective reflector 502 and is collimated and reflected into a TIR path within the waveguide 508. The collimated light 512 travels within the waveguide 508 until it interacts with an output coupler 514. As described above, various optical elements can be implemented as the output coupler 514. In the depicted system 500, the output coupler 514 is a surface relief grating. This may allow for injection molding as a method of manufacturing.

Another advantage in employing waveguides with simpler optics includes implementing full color displays. In near-eye displays using diffraction gratings, implementing full color can utilize different grating layers for each individual RGB color. Solutions based on multiplexing two or more gratings have been proposed for reducing the number of grating layers. However, complexity in manufacturability and design becomes an even larger issue. By implementing one-dimensional exit pupil expanding waveguides, the design of the optics is simplified. For example, multiple monochromatic projectors may be utilized to implement full color in the near-eye display. By using three monochromatic projectors instead of a single full color projector, the cost and complexity of the device increases. However, the optics of each projector are simpler. For example, compared to other methods, correction for chromatic aberrations can be avoided. Issues with color uniformity in diffractive waveguides for two-dimensional exit pupil expansion results from light taking multiple paths and then interfering. With one-dimensional exit-pupil expanding waveguides, the light travels in one path. This avoids interference. Such implementations can result in better color uniformity than waveguides for two-dimensional exit pupil expansion. In some current two-dimensional exit pupil expanding waveguide NEDs, two or even three separate waveguides are used to accommodate the red, green, and blue channels. The simpler one-dimensional exit pupil expanding waveguides can avoid this increase in size, cost, complexity, and weight.

Figure 6:
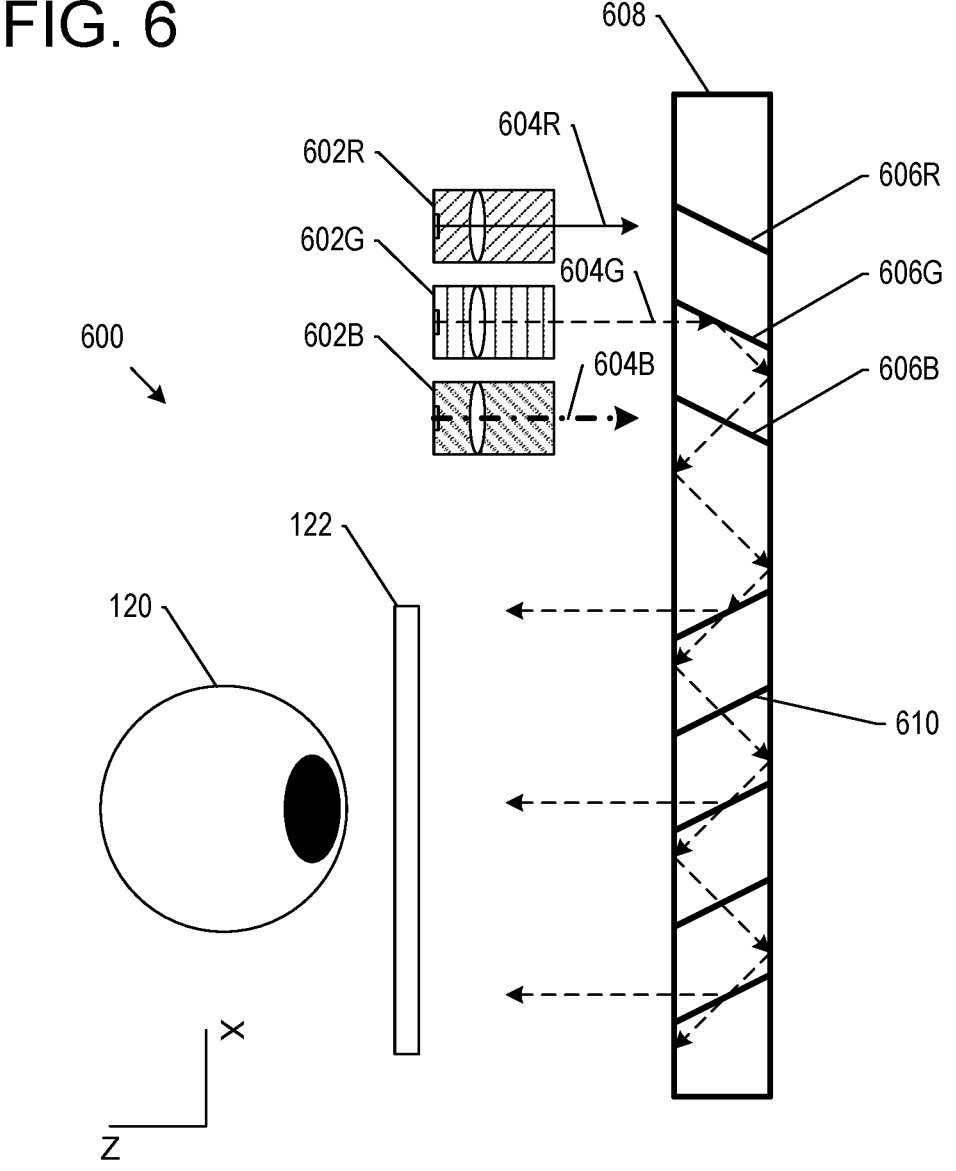
FIG. 6 shows an example near-eye display system implementing full color using monochromatic projectors in accordance with an implementation of the present disclosure.

FIG. 6 shows an example near-eye display system 600 implementing full color using monochromatic projectors 602R, 602G, and 602B in accordance with an implementation of the present disclosure. As shown, the near-eye display system 600 includes monochromatic projectors 602R, 602G, and 602B for projecting red 604R, green 604G, and blue light 604B, respectively, towards an input coupler. In the depicted system 600, a set of dichroic mirrors 606R, 606G, and 606B is implemented as the input coupler. Each dichroic mirror 606R, 606G, and 606B is designed to in-couple light from its respective monochromatic-projector. For example, dichroic mirror 606G is designed to in-couple green light 604G from monochromatic projector 602G. The green light 604G then travels within the waveguide 608 in a TIR path until it is coupled out of the waveguide 608 by an output coupler 610. Other color configurations can be implemented as appropriate depending on the specific application. In some implementations, a first projector is implemented for outputting light within a wavelength range of 600 nm-770 nm, a second projector is implemented for outputting light within a wavelength range of 495 nm-600 nm, and a third projector is implemented for outputting light within a wavelength range of 430 nm-495 nm. In such implementations, the input coupler is designed accordingly to effectively in-couple light from the projectors.

Figure 7:
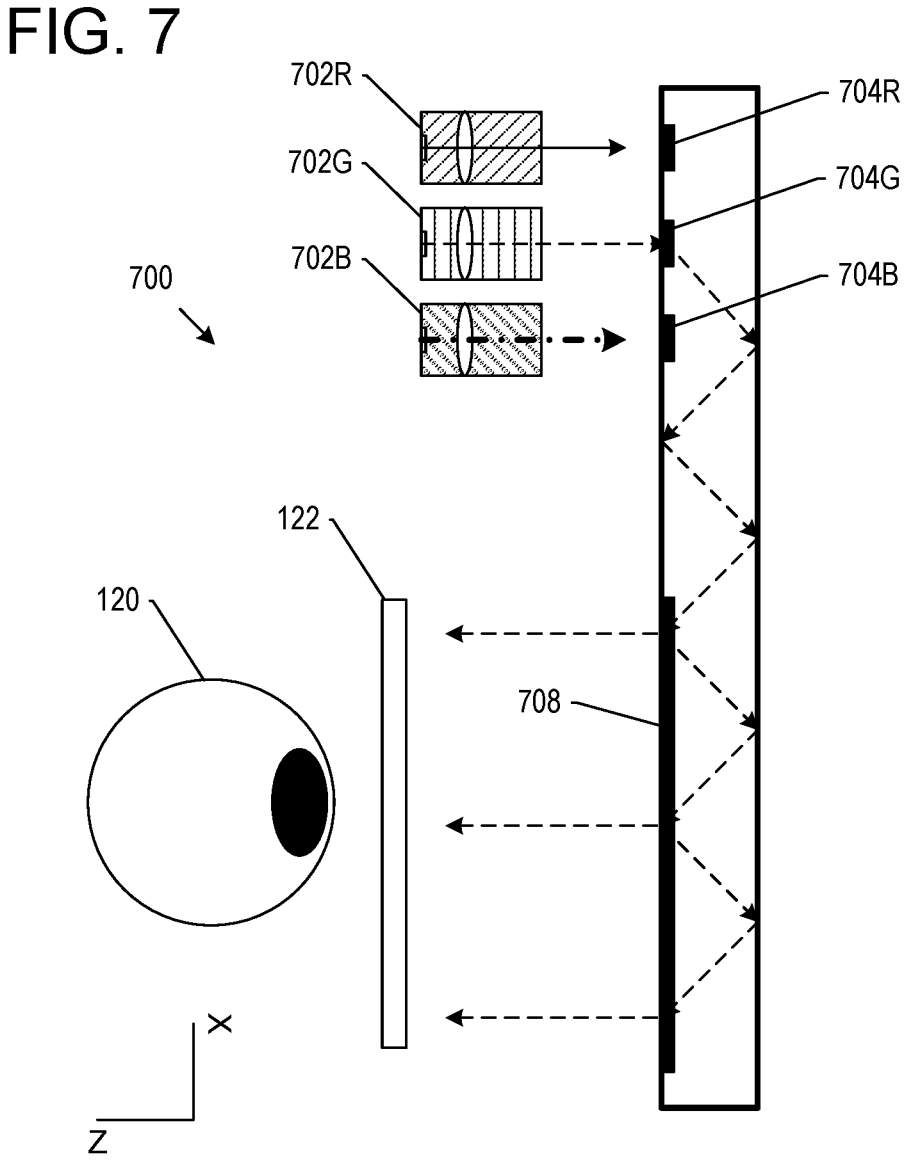
FIG. 7 shows an example near-eye display system implementing full color using diffraction gratings as an input coupler in accordance with an implementation of the present disclosure.

In the depicted system 600 of FIG. 6, three dichroic mirrors 606R, 606G, and 606B are implemented as the input coupler for three different wavelengths. As can readily be appreciated, different input coupler configurations may be implemented. In some implementations, three separate gratings are utilized as the input coupler. The in-coupling gratings may each be optimized for a specific wavelength or range of wavelengths, which may correspond to the wavelength(s) of light projected from its respective monochromatic projector. FIG. 7 shows a near-eye display system 700 implementing full color using diffraction gratings as an input coupler in accordance with an implementation of the present disclosure. As shown, the system 700 includes three monochromatic projectors 702R, 702G, and 702B projecting red 704R, green 704G, and blue light 704B, respectively, towards a set of three surface relief gratings 706R, 706G, and 706B functioning as an input coupler. In the depicted system 700, the output coupler 708 is also implemented using surface relief gratings. Other types of optical elements, including holographic optical elements such as holographic gratings, may be implemented as the input and/or output coupler.

Figure 8:
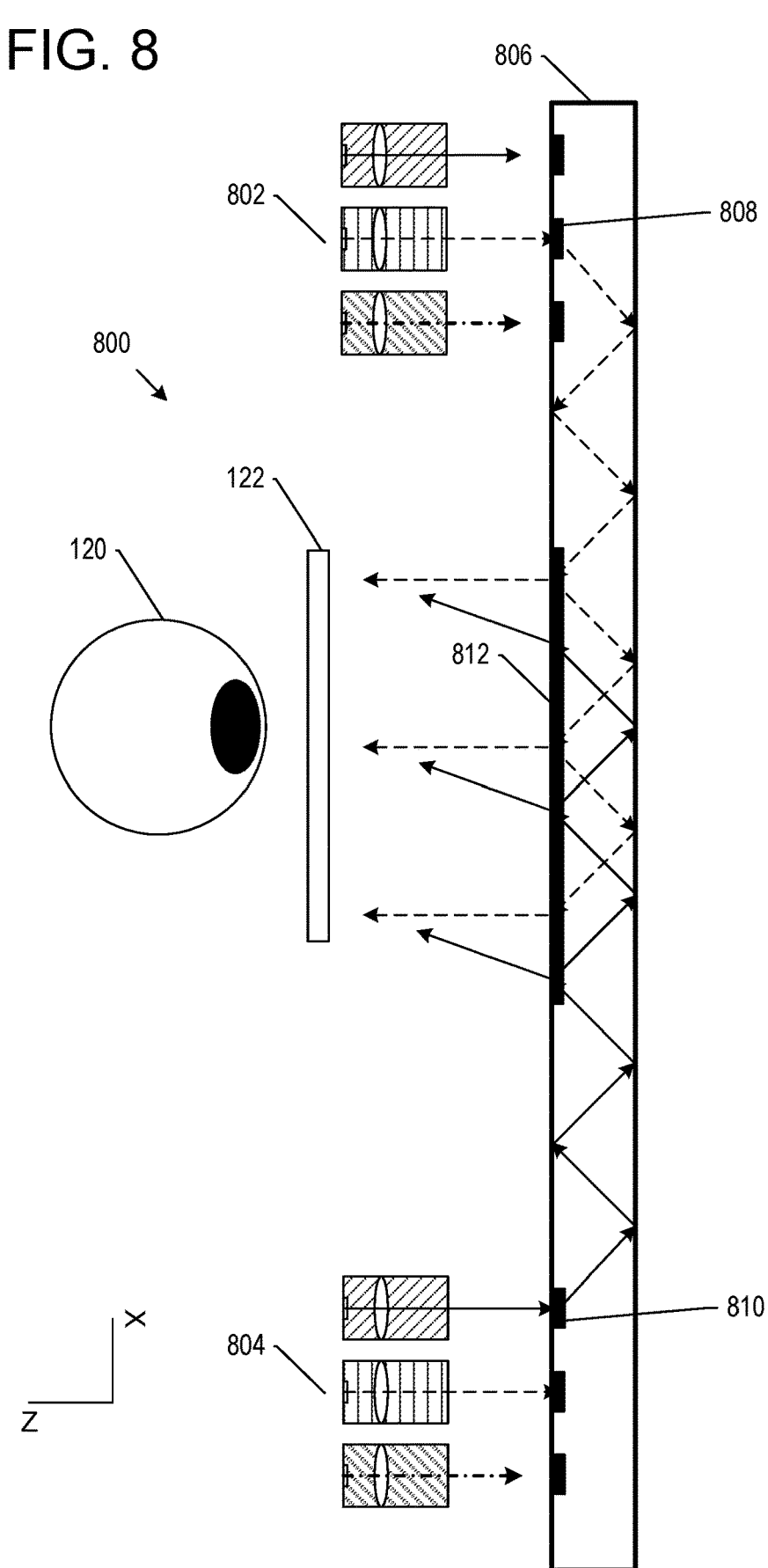
FIG. 8 shows an example near-eye display system implementing full color using two sets of monochromatic projectors positioned at opposite ends of a waveguide in accordance with an implementation of the present disclosure.

In addition to the use of different optical elements for the input coupler, different configurations in the placement of the optical elements can be implemented. For example, implementing full color in near-eye display systems can include the use of multiple sets of monochromatic projectors. In some configurations, each set of monochromatic projectors—e.g., a set of RGB projectors—can be placed at different points relative to the waveguide. FIG. 8 shows a near-eye display system 800 implementing full color using two sets 802, 804 of monochromatic projectors positioned at opposite ends of a waveguide 806 in accordance with an implementation of the present disclosure. The waveguide 806 includes two corresponding input couplers 808, 810. In the depicted system 800, each of the two input couplers 808, 810 comprises a set of three surface relief gratings. The input couplers 808, 810 in-couple light from their respective set of monochromatic projectors towards the same output coupler 812, which couples the light out of the waveguide 806.

Figure 9:
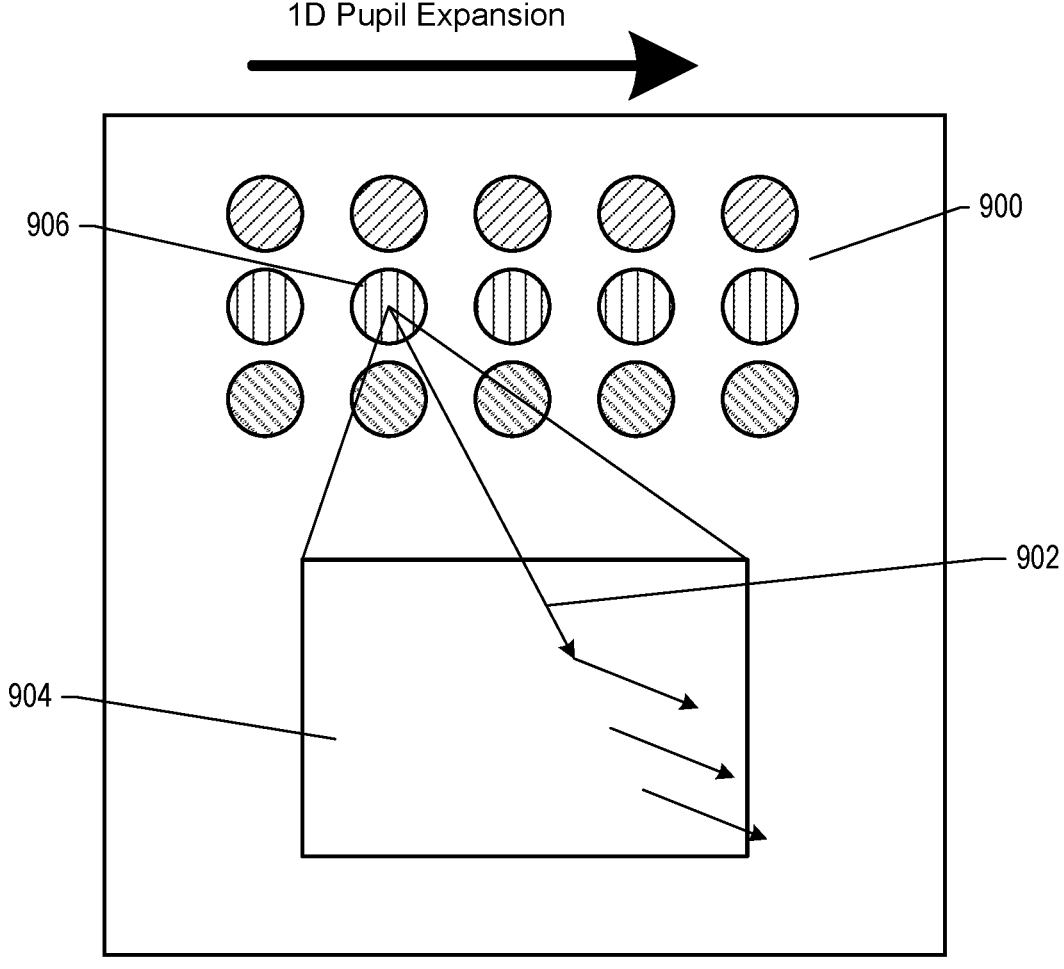
FIG. 9 conceptually illustrates an example of the use of multiple sets of monochromatic projectors in accordance with an implementation of the present disclosure.

Multiple sets of monochromatic projectors can be implemented as appropriate depending on the application. In some implementations, a first set of projectors is implemented for outputting light within a wavelength range of 600 nm-770 nm, a second set of projectors is implemented for outputting light within a wavelength range of 495 nm-600 nm, and a third set of projectors is implemented for outputting light within a wavelength range of 430 nm-495 nm. In such implementations, the input coupler is designed accordingly to effectively in-couple light from the projectors. FIG. 9 conceptually illustrates the use of multiple sets of monochromatic projectors 900 in accordance with an implementation of the present disclosure. As illustrated, the array of projectors 900 includes five sets of monochromatic projectors (e.g., RGB projectors). Each set of projectors is positioned in a different column, forming a 5×3 array of projectors. As depicted in FIG. 9, the projected image light is effectively expanded in the horizontal direction. Example ray 902 conceptually illustrates the portion of the eyebox 904 corresponding to projector 906.

Figure 10A:
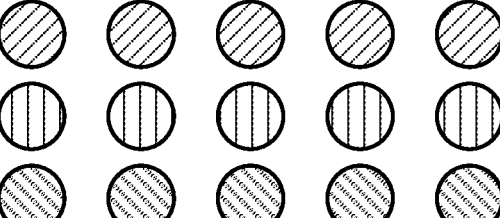
FIGS. 10A-10D show different example packing arrangements for an array of projectors in accordance with various implementations of the present disclosure.
Figure 10B:
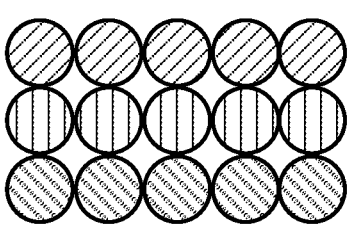
Figure 10C:
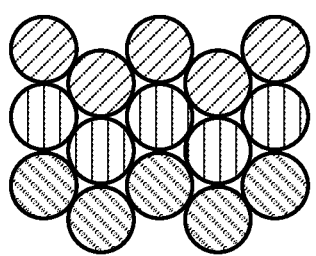
Figure 10D:
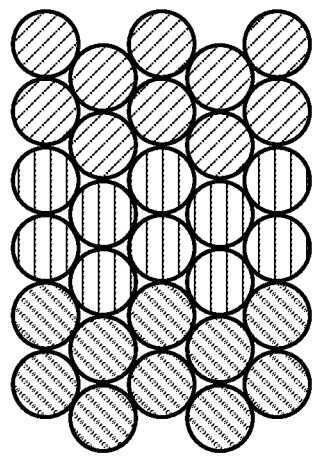

While the projectors 900 are shown here as being in a regular grid, other arrangements are possible. FIGS. 10A-10D show different packing arrangements for an array of projectors in accordance with various implementations of the present disclosure. In systems utilizing an array of projectors, gaps between the projectors can form gaps in the eyebox, which introduce intensity variations. In such cases, different packing arrangements may be implemented to minimize the gaps between the projectors. FIG. 10A shows a looser packing arrangement. FIG. 10B shows a tighter packing arrangement. FIG. 10C shows a packing arrangement where columns of the projectors are offset compared to their neighboring column(s). Such a configuration is less likely to create gaps in the eyebox. In some implementations, rows of the projectors are offset with their neighboring rows. FIG. 10D shows a packing arrangement where two rows of each monochromatic projectors are used to eliminate the gaps between them. Two monochromatic projectors that are on top of each other will create nearly identical FOVs.

Figures 11A, 11B:
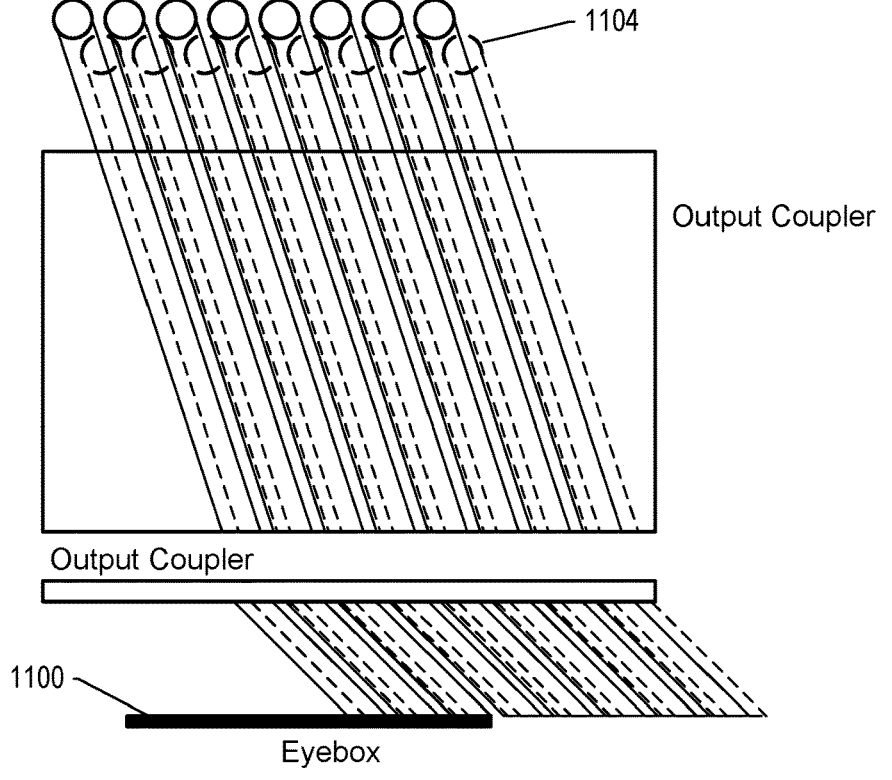
FIG. 11A conceptually illustrates an example of gaps in an eyebox created by a loose packing arrangement.
FIG. 11B conceptually illustrates how an offset row of projectors minimizes the gaps in the eyebox in an implementation according to the present disclosure.
Figure 11C:
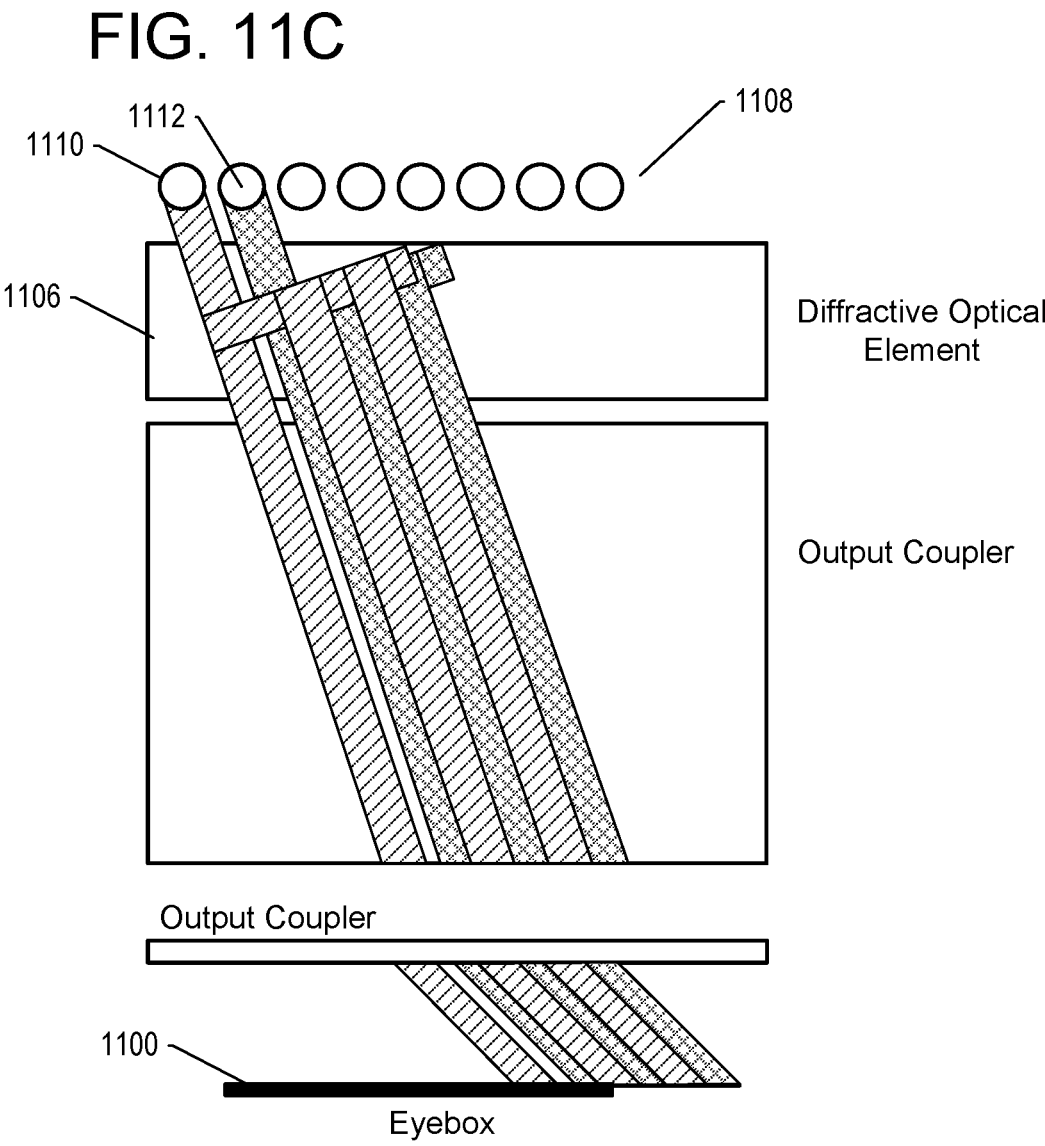
FIG. 11C conceptually illustrates how a diffractive optical element can be used to minimize the gaps in the eyebox created by a loose packing arrangement of projectors.

FIG. 11A conceptually illustrates the gaps in the eyebox 1100 created by a looser packing arrangement 1102. FIG. 11B conceptually illustrates how an offset row 1104 of projectors minimizes the gaps in the eyebox 1100. FIG. 11C conceptually illustrates how a diffractive optical element 1106 can be used to minimize the gaps in the eyebox 1100 created by a loose packing arrangement of projectors 1108. FIGS. 11A-11C each shows a plan view and a side view of their respective systems. In FIG. 11C, light paths from projectors 1110 and 1112 are shown. When light from either projector 1110 or projector 1112 interacts with the diffractive optical element 1106, it is partially redirected. Exit pupil expansion occurs, and the gaps between the projectors 1108 are filled in. Since exit pupil expansion is only needed to the extent of filling in the gaps between projectors, the optics for diffractive optical element 1106 can be simpler than diffractive optical elements in other waveguides for two-dimensional exit pupil expansion.

In near-eye display systems utilizing an array of projectors, each projector may be arranged and configured to output image light corresponding to a section of the image.

Figure 12:
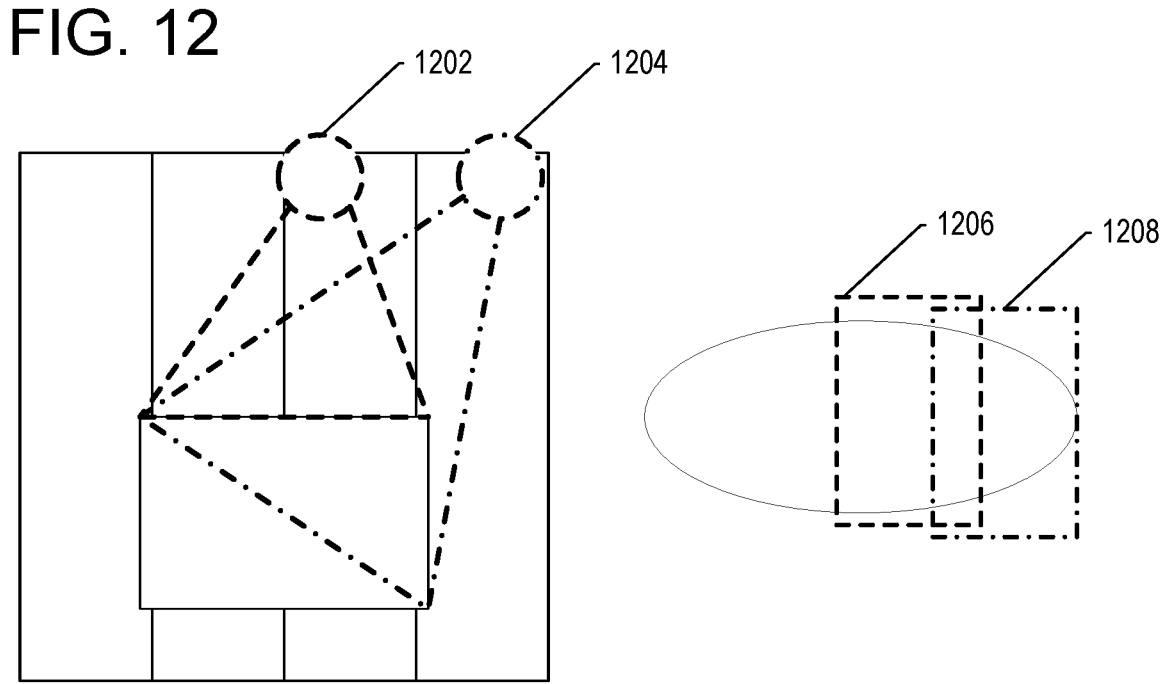
FIG. 12 conceptually illustrates an example of different FoVs created by different projectors.

As the position of the projector shifts, so does the part of the image that it creates. FIG. 12 conceptually illustrates different FoVs created by different projectors. In the depicted example, projectors 1202, 1204 creates FoVs 1206, 1208, respectively, for the image (shown as an ellipse). In this case, the FoV is segmented in the horizontal direction.

Figure 13:
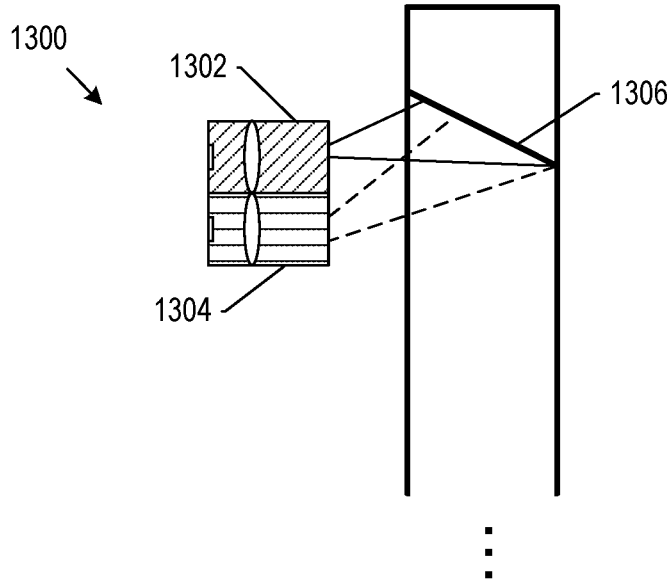
FIG. 13 shows an example near-eye display system comprising two projectors, each having an offset to its FOV compared to the other, in accordance with an implementation of the present disclosure.
Figure 14:
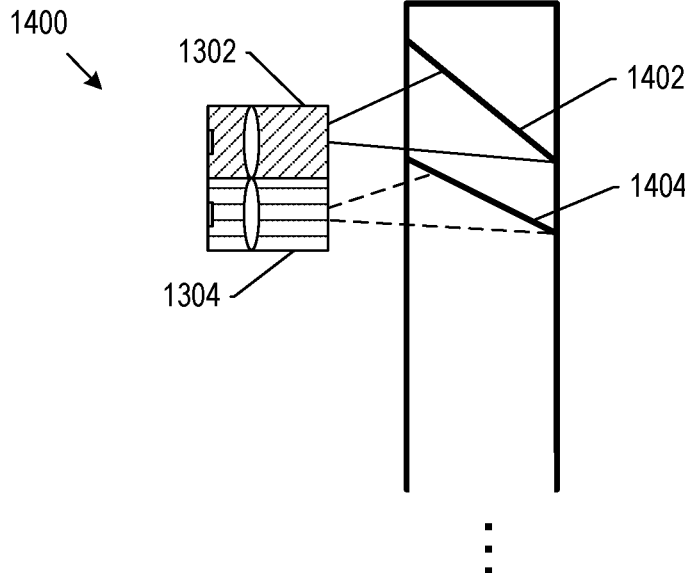
FIG. 14 shows a near-eye display system with two input couplers implemented using two mirrors having different angles in accordance with an implementation of the present disclosure.

In implementations where the projectors are not in line (e.g., the projectors are in a packing arrangement with a row or column offset), the input coupling can be adapted to the specific projector arrangement. One way to adapt input coupling into the waveguide is to break the FOV of the projectors into two or more portions. FIG. 13 shows a near-eye display system 1300 with two projectors 1302, 1304, each having an offset to its FOV compared to the other, in accordance with an implementation of the present disclosure. Effectively, this will give an offset to the FOV of projector 1304 such that more rays will intersect the input coupler 1306. In another implementation, two mirrors with different angles are utilized. FIG. 14 shows a near-eye display system 1400 with two input couplers implemented using two mirrors 1402, 1404 having different angles in accordance with an implementation of the present disclosure.

Figures 15, 16:
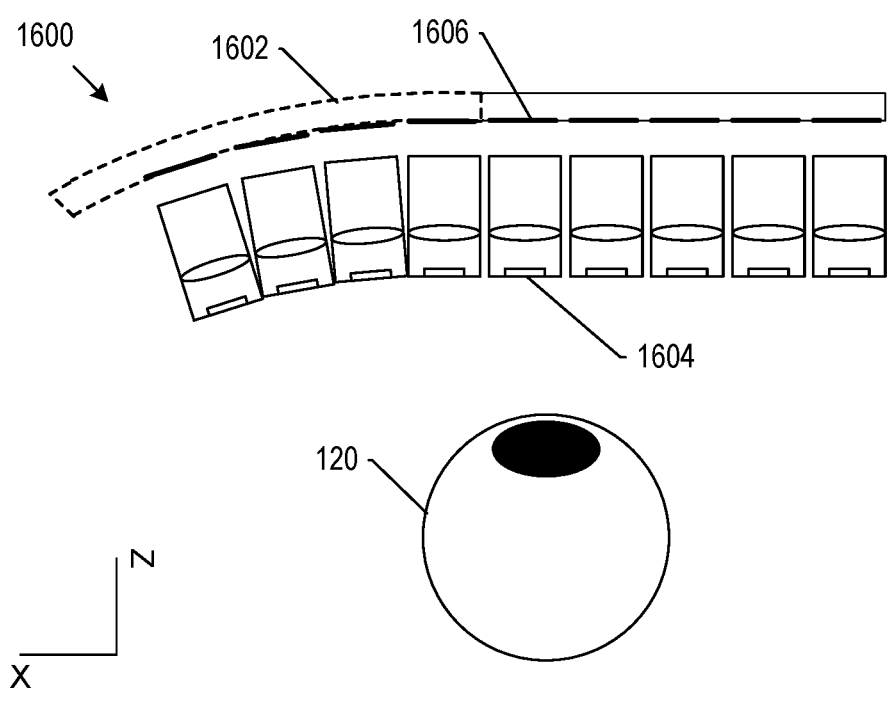
FIG. 15 shows a near-eye display system comprising a curved waveguide in accordance with an implementation of the present disclosure.
FIG. 16 shows a near-eye display system comprising a partially curved waveguide in accordance with an implementation of the present disclosure.

By using multiple projectors, curved waveguides may be implemented. FIG. 15 shows a near-eye display system 1500 with a curved waveguide 1502 in accordance with an implementation of the present disclosure. As shown, the system 1500 includes an array of projector 1504 arranged in a curved configuration. Each projector 1504 is paired with an appropriate input coupler 1506. In some implementations, the curved waveguide is plastic. The use of a plastic waveguide combined with an array of projectors, allows for the waveguide to be curved and for the FoV to extend beyond the limits of existing flat waveguides. In some examples, aberrations created by the waveguide can be pre-corrected by the projector. In other implementations, the corrections can be performed in real-time using a dynamic optical element, such as a liquid crystal cell, LCOS phase modulator, deformable mirror array, or liquid crystal grating. In another configuration, the waveguide is partially curved—e.g., flat in front of the user's central FOV (e.g., central 40-50 degrees) and curved everywhere else. FIG. 16 shows a near-eye display system 1600 with a partially curved waveguide 1602 in accordance with an implementation of the present disclosure. As shown, the system 1600 includes an array of projector 1604 arranged in a partially curved configuration to match the curve of the waveguide 1602 and the input couplers 1606. In the depicted near-eye display systems of FIGS. 15 and 16, the arrays of projectors are arranged to provide image light from a top-projection configuration. In other implementations, the near-eye display system implements side-projection optics.

FIG. 17 is a flow chart conceptually illustrating an example method 1700 for providing two-dimensional exit pupil expansion. Method 1700 can be implemented using the system of FIG. 1 or other suitable devices in accordance with implementations of the present disclosure. At step 1702, the method projects image light using an array of projectors arranged in a first dimension. Different types of projectors, such as monochromatic projectors, color projectors, scanning display engines, etc., may be utilized. Likewise, different packing arrangements of the projectors may be utilized. In some implementations, the array of projectors includes two or more columns of projectors, each column offset with one another. In some implementations, the array of projectors includes two or more rows of projectors, each row offset with one another. At step 1704, the method, using an input coupler, redirects the projected image light towards an output coupler within a waveguide in a TIR path. Different types of input couplers, such as a prism, a diffraction grating, a reflection grating, a surface relief grating, a holographic diffraction grating, a mirror, etc., and combinations of any two or more of such couplers, may be utilized. The image light is redirected towards an output coupler. At step 1706, the method, using the output coupler, expand the redirected image light in a second dimension transverse to the first dimension. In some implementations, the first and second dimensions are orthogonal or substantially orthogonal to one another. Different types of output couplers, such as a diffraction grating, a reflection grating, a surface relief grating, a holographic diffraction grating, a partially reflective mirror, etc., may be utilized. At step 1708, the method, using the output coupler, couples the expanded image light out of the waveguide. As described above, the expansion in the second dimension and the out-coupling occurs in the same process.

Another aspect provides a near-eye display system comprising an array of projectors arranged to output image light having an exit pupil expanded in a first dimension, the array of projectors arranged along the first dimension, and a waveguide comprising an input coupler to in-couple the image light from the array of projectors into the waveguide, and an output coupler to expand an exit pupil of the near-eye display system along a second dimension transverse to the first dimension, and out-couple the image light out of the waveguide. In this aspect, additionally or alternatively, the waveguide comprises plastic. In this aspect, additionally or alternatively, the waveguide comprises glass. In this aspect, additionally or alternatively, the input coupler comprises one or more of a holographic diffraction grating, a surface relief grating, a prism, or a mirror. In this aspect, additionally or alternatively, the array of projectors comprises a first plurality of projectors for outputting light within a wavelength range of 600 nm-770 nm, a second plurality of projectors for outputting light within a wavelength range of 495 nm-600 nm, and a third plurality of projectors for outputting light within a wavelength range of 430 nm-495 nm. In this aspect, additionally or alternatively, the input coupler comprises a dichroic filter. In this aspect, additionally or alternatively, the output coupler comprises one or more of a holographic diffraction grating, a surface relief grating, or a partially reflective mirror. In this aspect, additionally or alternatively, the waveguide is curved, and the array of projectors is arranged in a curved configuration. In this aspect, additionally or alternatively, the array of projectors comprises a first column of projectors and a second column of projectors offset from the first column. In this aspect, additionally or alternatively, the input coupler comprises a first optical element for in-coupling image light from a first projector in the array of projectors having a first portion of a field of view, and a second optical element for in-coupling image light from a second projector in the array of projectors having a second portion of the field of view different from the first portion of the field of view.

Another aspect provides a waveguide comprising an extended input coupler to in-couple image light expanded in a first dimension into the waveguide, and an output coupler to expand the in-coupled image light in a second dimension transverse to the first dimension and to out-couple the image light out of the waveguide. In this aspect, additionally or alternatively, the waveguide comprises plastic. In this aspect, additionally or alternatively, the waveguide comprises glass. In this aspect, additionally or alternatively, the extended input coupler comprises one or more of a holographic diffraction grating, a surface relief grating, a prism, a mirror, or a dichroic filter. In this aspect, additionally or alternatively, the output coupler comprises one or more of a holographic diffraction grating, a surface relief grating, or a partially reflective mirror. In this aspect, additionally or alternatively, the waveguide is curved.

Another aspect provides a method for providing two-dimensional exit pupil expansion, the method comprising projecting image light using an array of projectors arranged in a first dimension, using an input coupler, redirecting the projected image light towards an output coupler within a waveguide in a total internal reflection path, using the output coupler, expanding the redirected image light in a second dimension transverse to the first dimension, and using the output coupler, out-couple the expanded image light out of the waveguide. In this aspect, additionally or alternatively, the array of projectors comprises a first plurality of projectors for outputting light within a wavelength range of 600 nm-770 nm, a second plurality of projectors for outputting light within a wavelength range of 495 nm-600 nm, and a third plurality of projectors for outputting light within a wavelength range of 430 nm-495 nm. In this aspect, additionally or alternatively, the array of projectors comprises a first column of projectors and a second column of projectors offset from the first column. In this aspect, additionally or alternatively, the input coupler comprises one or more of a diffraction grating, a prism, a mirror, or a dichroic filter, and the output coupler comprises one or more of a one or more of a holographic diffraction grating, a surface relief grating, or a partially reflective mirror.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A near-eye display system comprising:
an array of projector displays arranged in a first dimension, wherein each projector display of the array of projector displays is configured to output image light such that the array of projector displays output image light having an exit pupil expanded in the first dimension; and
a waveguide comprising
an input coupler to in-couple the image light from the array of projector displays into the waveguide, and
an output coupler to expand an exit pupil of the near-eye display system along a second dimension transverse to the first dimension, and out-couple the image light out of the waveguide.

2. The near-eye display system of claim 1, wherein the waveguide comprises plastic or glass.

3. The near-eye display system of claim 1, wherein projector display of the array of projector displays comprises a light-emitting display or an illuminated light-modulating device.

4. The near-eye display system of claim 1, wherein the input coupler comprises one or more of a holographic diffraction grating, a surface relief grating, a prism, or a mirror.

5. The near-eye display system of claim 1, wherein the array of projector displays comprises a first plurality of projector displays for outputting light within a wavelength range of 600 nm-770 nm, a second plurality of projector displays for outputting light within a wavelength range of 495 nm-600 nm, and a third plurality of projector displays for outputting light within a wavelength range of 430 nm-495 nm.

6. The near-eye display system of claim 5, wherein the input coupler comprises a dichroic filter.

7. The near-eye display system of claim 1, wherein the output coupler comprises one or more of a holographic diffraction grating, a surface relief grating, or a partially reflective mirror.

8. The near-eye display system of claim 1, wherein the waveguide is curved, and the array of projector displays is arranged in a curved configuration.

9. The near-eye display system of claim 1, wherein the array of projector displays comprises a first column of projector displays and a second column of projector displays offset from the first column.

10. The near-eye display system of claim 1, wherein the input coupler comprises:

a first optical element for in-coupling image light from a first projector display in the array of projector displays having a first portion of a field of view; and a second optical element for in-coupling image light from a second projector display in the array of projector displays having a second portion of the field of view different from the first portion of the field of view.

11. A near-eye display system comprising:

an array of light-emitting displays arranged in a first dimension, wherein each light-emitting display of the array of light-emitting displays is configured to output image light such that the array of light-emitting displays output image light having an exit pupil expanded in the first dimension; and a waveguide comprising:

an extended input coupler to in-couple the image light from the array of light-emitting displays having the exit pupil expanded in the first dimension into the waveguide; and an output coupler to expand the in-coupled image light in a second dimension transverse to the first dimension and to out-couple the image light out of the waveguide.

12. The near-eye display system of claim 11, wherein the waveguide is made of plastic.

13. The near-eye display system of claim 11, wherein the waveguide is made of glass.

14. The near-eye display system of claim 11, wherein the extended input coupler comprises one or more of a holographic diffraction grating, a surface relief grating, a prism, a mirror, or a dichroic filter.

15. The near-eye display system of claim 11, wherein the output coupler comprises one or more of a holographic diffraction grating, a surface relief grating, or a partially reflective mirror.

16. The near-eye display system of claim 11, wherein the waveguide is curved.

17. A method for providing two-dimensional exit pupil expansion, the method comprising:

projecting image light using an array of projector displays arranged in a first dimension, wherein each projector display of the array of projector displays is configured to output image light such that the array of projector displays output image light having an exit pupil expanded in the first dimension;

using an input coupler, redirecting the projected image light towards an output coupler within a waveguide in a total internal reflection path;

using the output coupler, expanding the redirected image light in a second dimension transverse to the first dimension; and using the output coupler, out-couple the expanded image light out of the waveguide.

18. The method of claim 17, wherein the array of projector displays comprises a first plurality of projector displays for outputting light within a wavelength range of 600 nm-770 nm, a second plurality of projector displays for outputting light within a wavelength range of 495 nm-600 nm, and a third plurality of projector displays for outputting light within a wavelength range of 430 nm-495 nm.

19. The method of claim 17, wherein the array of projector displays comprises a first column of projector displays and a second column of projector displays offset from the first column.

20. The method of claim 17, wherein:

the input coupler comprises one or more of a diffraction grating, a prism, a mirror, or a dichroic filter; and the output coupler comprises one or more of a one or more of a holographic diffraction grating, a surface relief grating, or a partially reflective mirror.

* * * * *